United States Patent [19]

Shirai

[11] Patent Number: 4,818,165
[45] Date of Patent: Apr. 4, 1989

[54] THREADED ELEMENT FOR USE AS AN INSERT

[75] Inventor: Yoji Shirai, Fujisawa, Japan

[73] Assignee: Rexnord Inc., Torrance, Calif.

[21] Appl. No.: 40,892

[22] Filed: Apr. 21, 1987

[30] Foreign Application Priority Data

Apr. 23, 1986 [JP] Japan .................................. 61-92377

[51] Int. Cl.⁴ ............................................ F16B 37/12
[52] U.S. Cl. ................................... 411/178; 411/180;
411/436; 411/386; 411/416; 408/217
[58] Field of Search ............... 411/178, 177, 180, 436,
411/437, 386, 411, 395, 416–418; 408/215–217,
226

[56] References Cited

U.S. PATENT DOCUMENTS

| 3,200,691 | 8/1965 | Neuschotz | 411/422 |
| 3,209,383 | 10/1965 | Carlson | 411/416 X |
| 3,405,591 | 10/1968 | Neushotz | 411/178 X |
| 3,530,760 | 9/1970 | Lindstrand | 411/416 |
| 4,069,730 | 1/1978 | Gutshall | 411/386 |

FOREIGN PATENT DOCUMENTS

| 1556730 | 3/1968 | France | 411/416 |
| 847579 | 2/1959 | United Kingdom . | |
| 966029 | 5/1961 | United Kingdom . | |
| 1506870 | 9/1975 | United Kingdom . | |

Primary Examiner—Lloyd A. Gall
Assistant Examiner—Curtis B. Brueske
Attorney, Agent, or Firm—Pretty, Schroeder, Brueggemann & Clark

[57] ABSTRACT

A threaded element for forming a threaded profile in the wall of a bore formed in a material and for insertion into the bore so as to reinforce the bore. The threaded element includes a cylindrical stem having an external thread having a plurality of separate tapping lobes for cutting the threaded profile in the wall of the bore. The stem has an unthreaded radius smaller than the unthreaded radius of the bore and a threaded radius greater than the unthreaded radius of the bore. A recess is defined between each adjacent pair of tapping lobes. Each tapping lobe is defined by two cutting arcs formed at its opposite ends and a convex escape-gap arc is located intermediate the two cutting arcs. Each cutting arc has a convex configuration relative to the center of the stem, and the apex of each of the cutting arcs defines the maximum thread radius of the threaded profile, as measured from the center of the stem. Each escape-gap arc is convex and has an escape radius that is smaller than the aforementioned maximum thread radius but greater than the minimum thread radius of the threaded profile, as measured from the center of the stem.

11 Claims, 3 Drawing Sheets

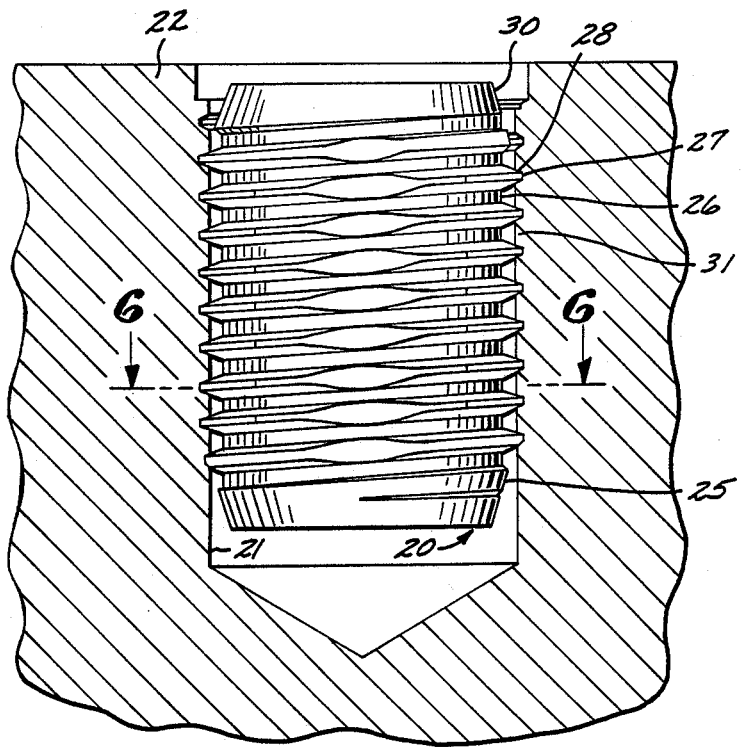
FIG. 1
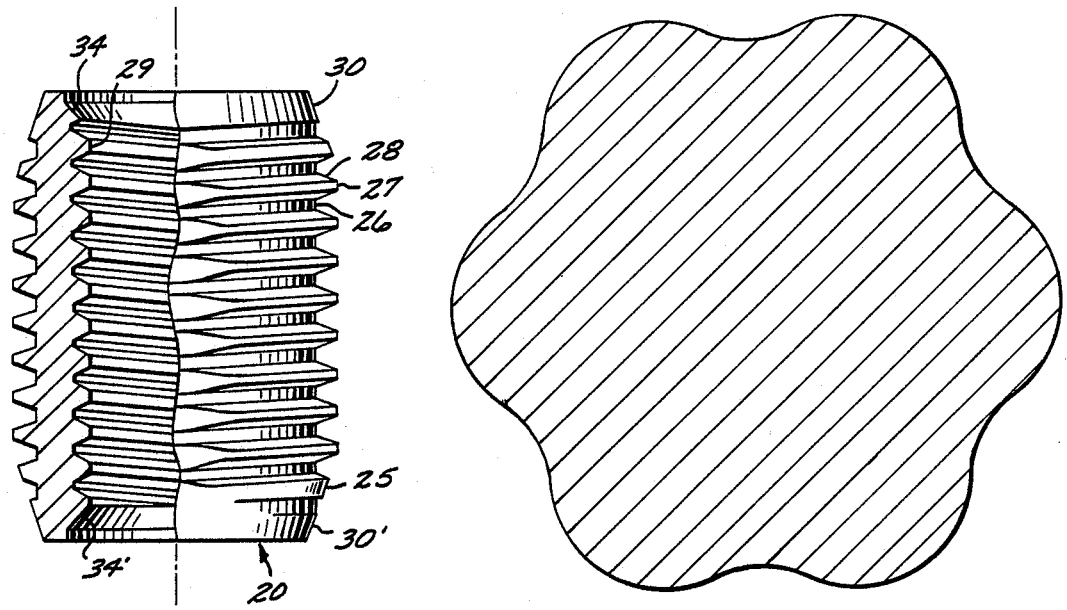
FIG. 2
FIG. 3 PRIOR ART

THREADED ELEMENT FOR USE AS AN INSERT

BACKGROUND AND SUMMARY OF THE INVENTION

1. Technical Field

This invention relates to a threaded element for forming a threaded profile in the wall of a bore formed in a material, such as plastic, or a part, such as a zinc or aluminum alloy diecasting part, and for insertion into the bore so as to reinforce the bore. Threaded elements of this nature are used in products such as bicycles and electrical home appliances, and in various other industrial fields.

2. Prior Art

Frequently a bolt which is inserted into a threaded bore in a plastic material, or a zinc or aluminum alloy diecasting part is inadequately tight in light of the deficiency in strength of the aforementioned type of material or part when compared with steel. This fact makes the threaded profile of the threaded bore more likely to become ineffective or damaged. In such cases, it is, therefore, advantageous to install a threaded element within the threaded bore. A typical one of such kind is disclosed in U.S. Pat. No. 3,200,691 to Neuschotz, which has the same shape at the ends, and thus is advantageously installable in bidirectional way. When installed in a bore of a somewhat greater inner diameter than specifications dictate, however, the force with which the threaded element is retained against removal from the bore, hereinafter referred to as a pull-out strength, falls remarkably. This constitutes a significant problem with the threaded element of U.S. Pat. No. 3,200,691.

OBJECTS AND FEATURES OF THE INVENTION

It is, therefore, the principal object of the invention to provide a threaded insert element which not only has the same cross-sectional configuration at its ends, thereby advantageously having not only bidirectional installability as disclosed in U.S. Pat. No. 3,200,691 but also being free from the aforesaid defect that the pull-out strength becomes sharply lower with only a little improperly larger inner diameter of the bore. This problem has been solved by virtue of the feature of the present invention that the cross-sectional configuration of the threaded element has basically a symmetrical closed line consisting of alternately convex and concave portions with the same interval and every other concave portion thereof is replaced by a circular arc about the axis of said threaded element, the radius thereof being a little shorter than the distance to the peak of said convex curvature. That is to say, each of the threads of the threaded element is characterized by three separate tapping lobes oriented along a radial axis of the threaded element. Each such tapping lobe is defined by two convex cutting arcs formed on opposite ends of each of the lobes and a convex escape-gap arc situated intermediate the cutting arcs. The apex of each of the cutting arcs defines to the maximum radius of the thread, while the radius of the escape-gap arc is a little smaller than the aforementioned maximum radius. The escape-gap arcs replace selected concave arcs located intermediate selected convex cutting arcs of the threaded element of U.S. Pat. No. 3,200,691.

The threaded element according to the invention can be installed by screwing it into a unthreaded bore previously formed in a material or part with the result that the threaded element forms a threaded profile in the wall of the bore and is thereafter retained in the bore. The threaded element of the present invention tends to have a greater pull-out strength than previous threaded elements in that the particular cross-sectional configuration of its threads increases the engagement area or encroachment area between the threaded element and the wall of the bore as compared to other threaded elements. That is, it increases the cross-sectional area of the threaded element that protrudes into the wall of the bore and, consequently, into the threaded profile formed by the threaded element.

DESCRIPTION OF THE PREFERRED EMBODIMENT

FIG. 1 illustrates an elevational section view of an embodiment of threaded element 20 according to the invention when installed in an initially unthreaded bore 21 of a connectable material or part 22.

The threaded element 20 according to the invention is held on an installation tool by engagement of an internal thread 29 of the element 20 with an external thread of the tool, as shown in FIG. 2. The element 20 is then screwed into the bore 21 previously formed in the material or part 22 such that the element 20 taps the wall 31 of the bore 21 through the cutting action of an external threads 25 of the threaded element 20.

As understood from FIG. 2, the threaded element 20 has an internal thread 29 of standard dimensions through the center, inner chamfers 34, 34' and outer chamfers 30, 30' at the upper and lower ends, respectively, all having the same shape.

FIG. 4 shows the cross-sectional configuration of the threaded element 20 along its threads 25 according to the present invention. It has three diameters 1-7, 3-9 and 5-11 of 2R which extend between opposite peaks or apexes 27 of convex cutting arcs and intersect at the transverse axis of the threaded element 20 (where R is maximum radius relative to the radial axis of the threaded element 20) and three minimum diameters 2-8, 4-10, and 6-12 which similarly intersect the aforementioned transverse axis but extend between the peak of a convex escape-gap arc and an opposing concave surface that corresponds to the curvature of the bottom 26 of the external thread 25. As shown in FIG. 4, every other concave curvature as represented by a broken line in the prior art is replaced by a convex escape-gap arc of radius $R_1$ which is a little ($\Delta r$) shorter than the maximum radius R.

According to the invention, each external thread 25 of the threaded element 20 has the aforementioned cross-sectional configuration along itself such that each thread 25 forms three tapping lobes as shown in FIG. 6. The threaded element 20 of the present invention can be installed with little interference with the surface of the bore 21, with substantially the same torque as that of threaded elements of prior art, and with an increased sectional encroachment area on the wall 31 of the bore 21.

The invention will now be described more fully be reference to FIG. 5, which illustrates, on an enlarged scale, a cross-sectional view of about one-half of a cross section of the threaded element 20.

The following is a list of symbols referred to in FIG. 5 and their corresponding definitions.

$R = \overline{OC}$: Maximum radius from the transverse axis "0" of the threaded element to a peak "C"
$R_1 = \overline{OD}$: A little shorter radius than R
$R_3 = \overline{OA}$: Unthreaded radius of the bore 21
$R_3' = \overline{OA'}$: A little longer unthreaded radius than $R_3'$
$R_4 = \overline{PA}$: Radius of the convex curvature
$\alpha$: $\angle AOC$, $\alpha'$: $\angle BOP$, $\alpha''$: $\angle A'OC$
$\beta$: $\angle OAP$, $\beta'$: $\angle OBP$, $\beta''$: $\angle OA'p$
A, E, F: Intersections of the circumferences of $R_3$ and $R_4$
A', E', F': Intersections of the circumferences of $R_4$ and $R_3'$
C, H: Intersections of the circumferences of R and $R_4$
B, D, G: Intersections of the circumferences of $R_1$ and $R_4$ Now, the sectional area that the cross section of the prior art threaded element shown in FIG. 3 encroaches on the wall 31 of the bore 21 is equal to six times the sectional area ABCDE. Letting area ABCDE be equal to $A_1$, then:

$S = \frac{1}{2}(R_3 + R_4 + R - R_4) = \frac{1}{2}(R_3 + R)$ $S' = \frac{1}{2}(R_1 + R_4 + R - R_4) = \frac{1}{2}(R_1 + R)$ $S'' = \frac{1}{2}(\underline{R_1} + R_4 + R - R_4) = \frac{1}{2}(\underline{R_3} + R)$

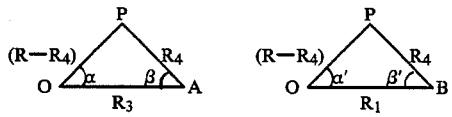

$\sin \alpha/2 = \sqrt{\frac{\{S - (R - R_4)\}(S - R_3)}{(R - R_4) R_3}}$ $\sin \beta/2 = \sqrt{\frac{(S - R_3)(S - R_4)}{R_3 R_4}}$ $\sin \alpha'/2 = \sqrt{\frac{\{S' - (R - R_4)\}(S' - R_1)}{(R - R_4) R_1}}$ $\sin \beta'/2 = \sqrt{\frac{(S' - R_1)(S' - R_4)}{R_1 R_4}}$ $\sin \alpha''/2 = \sqrt{\frac{\{\underline{S} - (R - R_4)\}(\underline{S} - R_3')}{(R - R_4) R_3'}}$ $\sin \beta''/2 = \sqrt{\frac{(\underline{S} - R_3')(\underline{S} - R_4)}{R_3' R_4}}$ $S_1 = \sqrt{S(S - R_4)\{S - (R - R_4)\}(S - R_3)}$ $S_2 = \sqrt{S'(S' - R_4)\{S' - (R - R_4)\}(S' - R_1)}$ $S_3 = \sqrt{\underline{S}(\underline{S} - R_4)\{\underline{S} - (R - R_4)\}(\underline{S} - R_3')}$ where
$S_1$: Area of $\triangle AOP$,
$S_2$: Area of $\triangle BOP$,
$S_3$: Area of $\triangle A'OP$
It therefore follows that $A_1 = \pi R_4^2 \times \frac{2(\alpha + \beta)}{360} - \left(\pi R_3^2 \times \frac{2\alpha}{360} - 2 S_1\right)$ As described above, in the prior art, it is 6 times of $A_1$ in section that encroaches on the wall of the bore.

Likewise, the sectional area of the prior art threaded element of FIG. 3 that encroaches upon the wall 31 of the bore 21 where the bore is of a little greater radius $R_3'$ is equal to six times the sectional area A'BCDE'. That is, let sectional area A'BCDE' be $A_2$, then:

$A_2 = \pi R_4^2 \times \frac{2(\alpha'' + \beta'')}{360} - \left(\pi R_3'^2 \times \frac{2\alpha''}{360} - 2 S_3\right)$ $A_1$ and $A_2$ are areas defined by the circular arcs and, therefore, a small enlargement of the inner diameter of the bore 21 results in sharp reduction of the cross-sectional encroachment area, and thus in a markedly-lowered pull-out strength. Defining $B_1$ and $B_2$ to be areas CE'F'H and CDGH of which the radius is a little ($\Delta r$) shorter than the maximum radius R, respectively, $B_1 = \frac{\pi R^2 - \pi R_3^2}{6} - $ $\left(\pi R_4^2 \frac{2(\alpha'' + \beta'')}{360} - \left(\pi R_3^2 \times \frac{2\alpha''}{360} - 2S_3\right)\right)$ $B_2 = \frac{\pi R^2 - \pi R_1^2}{6} - $ $\left(\pi R_4^2 \frac{2(\alpha' + \beta')}{360} - \left(\pi R_1^2 \times \frac{2\alpha'}{360} - 2S_2\right)\right)$ Letting C be area DE'F'G, $C = B_1 - B_2$, it follows that the increased area is $C \times 3$. Consequently, the encroachment area is increased by $C \times 3$ in that there are three convex escape-gap arcs according to the present invention. It will, therefore, be appreciated that the cross-sectional encroachment area of the prior art threaded element on the wall 31 of bore 21 is $6A_1$ and that of the threaded element 20 according to the invention is $6A_2 + 3C$ when the bore 21 has a somewhat increased radius, $R_3'$.

Comparative list of individual parameters of a threaded element M6 is as follows:

$R = 4.70$ mm   $S_1 = 1.89$ mm$^2$
$R_1 = 4.63$ mm   $S_2 = 0.963$ mm$^2$
$R_3 = 4.35$ mm   $S_3 = 1.62$ mm$^2$
$R_3' = 4.45$ mm $R_4 = 1.75$ mm    $\pi R^2 = 69.40$ mm$^2$ $R - R_4 = 2.95$ mm    $\pi R_1^2 = 67.35$ mm$^2$ $S = 4.53$ mm    $\pi R_3^2 = 59.45$ mm$^2$ $S' = 4.67$ mm    $\pi R'_3^2 = 62.21$ mm$^2$ $S'' = 4.575$ mm    $\pi R_4^2 = 9.62$ mm$^2$ $\alpha = 17.07\cdot$    $\beta = 29.72\cdot$ $\alpha' = 8.14\cdot$    $\beta' = 13.79\cdot$ $\alpha'' = 14.29\cdot$    $\beta'' = 24.59\cdot$ $$A_1 = \left[\pi \times 1.75^2 \times \frac{2(17.07 + 29.72)}{360} - \left(\pi \times 4.35^2 \times \frac{2 \times 17.07}{360} - 2 \times 1.89\right)\right]\text{mm}^2$$

$$A_1 = [2.501 - (5.638 - 3.780)] \text{ mm}^2 = 0.643 \text{ mm}^2$$
$$0.643 \text{ mm}^2 \times 6 = 3.858 \text{ mm}^2$$

$$A_2 = \left[\pi \times 1.75^2 \times \frac{2(14.29 + 24.59)}{360} - \left(\pi \times 4.45^2 \times \frac{2 \times 14.29}{360} - 2 \times 1.62\right)\right]\text{mm}^2$$

$$A_2 = 0.379 \text{ mm}^2$$
$$A^2 \times 6 = 0.379 \text{ mm}^2 \times 6 = 2.274 \text{ mm}^2$$

$$B_1 = \left[\frac{\pi \times 4.70^2 - \pi \times 4.35^2}{6} - A_2\right]\text{mm}^2$$

$$B_1 = (1.658 - 0.379) \text{ mm}^2 = 1.279 \text{ mm}^2$$

$$B_2 = \left[\frac{\pi \times 4.70^2 - \pi \times 4.63^2}{6} - \left(\pi \times 1.75^2 \frac{2(8.14 + 13.79)}{360} - \left(\pi \times 4.63^2 \times \frac{2 \times 8.14}{360} - 2 \times 0.963\right)\right]\text{mm}^2\right)$$

$$B_2 = (0.342 - 0.052) \text{ mm}^2 = 0.29 \text{ mm}^2$$

$$C = B_1 - B_2 = (1.279 - 0.29) = 0.989$$

$$C \times 3 = (0.989 \times 3) = 2.967 \text{ mm}^2$$

$$A_1 \times 6 = 3.858 \text{ mm}^2$$

$$A_2 \times 6 + C \times 3 = 2.274 + 2.967 \text{ mm}^2 = 5.241 \text{ mm}^2$$

From the foregoing, it will be apparent that the area $A_1 \times 6$ which is equal to 2.274 is only equal to 58.9% of the area $A_1 \times 6$ which is equal to 3.858. Consequently, an increase of 0.1 mm (i.e. $R_3' - R_3$) in the radius of the bore 21 is accompanied by marked reduction of the cross-sectional area, and as the result, the pull-out strength drops greatly. It therefore is indispensable for the solution of this problem to prevent the encroachment area from getting sharply low compared with $A_1 \times 6$. In view of this, the cross-sectional configuration of the threaded element 20 according to the invention has an encroachment area of $A_2 \times 6 + C \times 3 = 5.241$ mm$^2$, which is 1.36 times "$A_1 \times 6'$. Thus, the threaded element 20 of the present invention has an adequately increased pull-out strength.

The function of the threaded element 20 according to the invention will now be described. It is screwed downwardly into a bore 21 of a material or part such that its external threads 25 form a threaded profile in the wall 31 of the bore 21, as shown in FIG. 1. FIG. 6 shows that the external threads 25 each have three separate tapping lobes each of which consists of two convex cutting arcs formed on opposite ends of the lobes and a convex escape-gap arc intermediate the two convex cutting arcs. As shown in FIG. 7, the external thread peaks 27, 28 of the external threads 25, which correspond to the apex of the convex cutting arcs, cut an internal thread 32,33 on the wall 31 of the bore 21. As shown in FIGS. 2 and 7-9, a reference numeral 26 designates the bottom of the external thread 25 of the threaded element 20. FIG. 8 illustrates the threaded profile 32, 33 formed on the wall 31 of the bore 21 through engagement of the external threads 25 of the threaded element 20 with the wall 31 is affected with contraction in the course of the subsequent tapping. That is, the threaded profile tends to contract during intervals at which only the bottom 26 of the external thread 25 is in alignment with the threaded profile cut by the external thread 25. FIG. 9, which is a cross-sectional view taken line 9—9 of FIG. 6, depicts an escape gap formed by the bottom 32 of the internal thread 32,33 and the apex of the external thread peak 27,28 of the external thread 25 of the threaded element 20. The escape gap permits the threaded element 20 to be screwed into the bore 21 with less resistance. As shown by the force vectors in FIG. 9, the escape gap also permits the threaded profile to contract somewhat during the course of the tapping of the wall 31 of the bore 21 by external threads 25 of the threaded element 20. This tends to prevent the threaded element 20 from loosening its threaded engagement with the wall 31 of the bore 21 due to vibration and otherwise. Besides, the cross-sectional configuration of the external thread 25 of the threaded element 20, formed as shown in FIG. 6, permits an axial load on the external thread 25 to be imposed on the ridge of the external thread 25 of the threaded element 20 to be and not on the groove. This results in elastic deformation caused by the axial load where the internal thread 32, 33 of the wall 31 of the bore 21 mates with the external thread 25 of the threaded element 20 and on the other hand remaining unaffected by the axial load where it mates with the recess of the external thread 25. Thus, a small dislocation is produced at the boundary between the peak and the recess which tends to prevent loosening of the threaded element 20 due to vibration.

The cross-sectional configuration according to the present invention can be easily obtained by drawing a bar stock through a die, and mass-production of the threaded element 20 according to the invention can be made with ease by an automatic machine.

Advantages of the invention

The threaded element 20 for use as an insert according to the invention can be employed for forming a reinforced threaded bore of a connectable material or part, substantially without lowering of the pull-out strength, so far as variation in diameter of the bore is within about 0.2 mm.

BRIEF DESCRIPTION OF THE DRAWINGS

FIG. 1 is an elevational view of a threaded element according to the invention illustrated as installed in a bore of a connectable material or part;

FIG. 2 is a front elevational view of the same threaded element, of which the left half is shown in cross-section;

FIG. 3 is a cross-sectional view of a prior art threaded elements;

Figure 4:
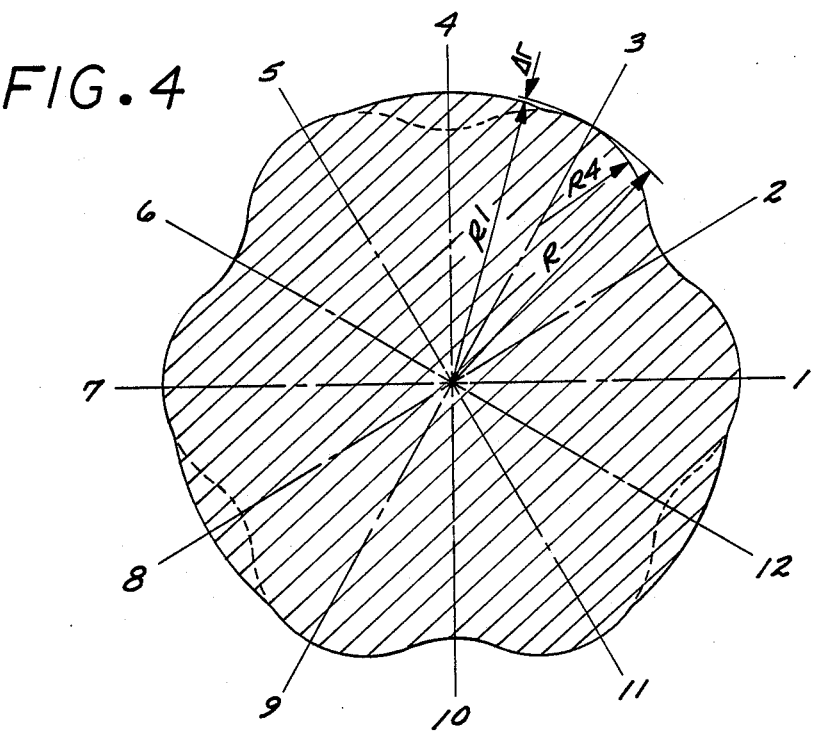
FIG. 4 is a cross-sectional view of the threaded element according to the invention in an enlarged scale.
Figure 5:
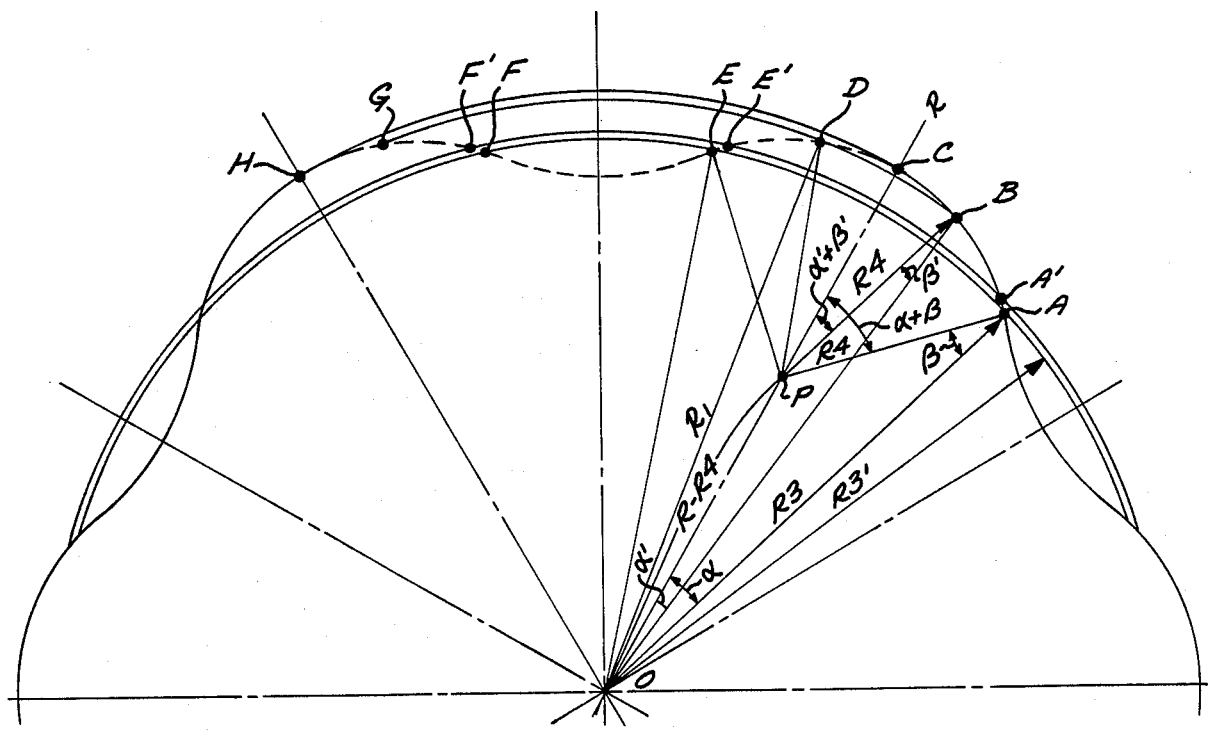
FIG. 5 is an illustration for comparison in cross-sectional configuration between the threaded elements of the prior art and the present invention.
Figure 6:
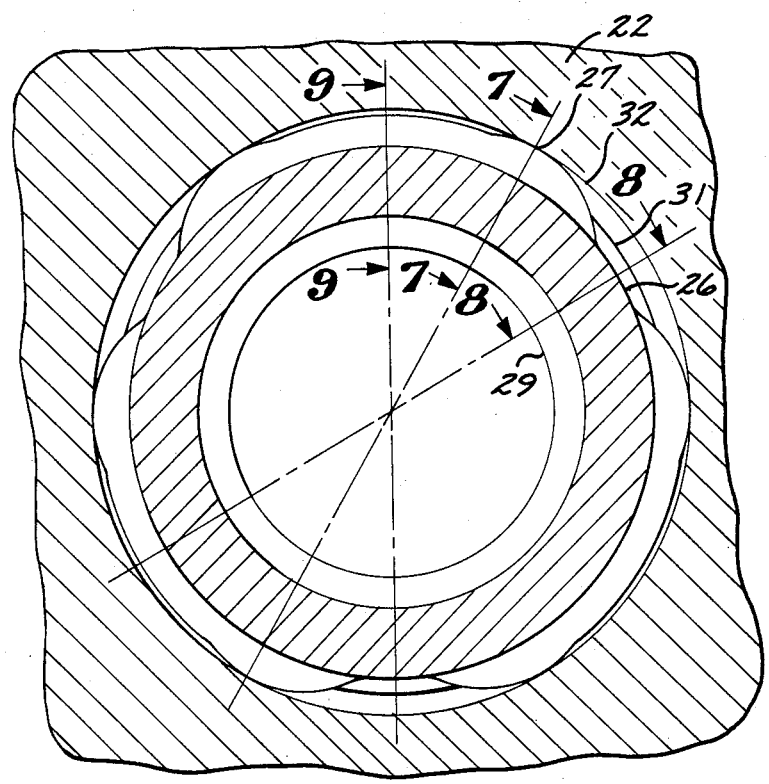
FIG. 6 is a cross-sectional view taken along line 6—6 of FIG. 1.
Figure 7:
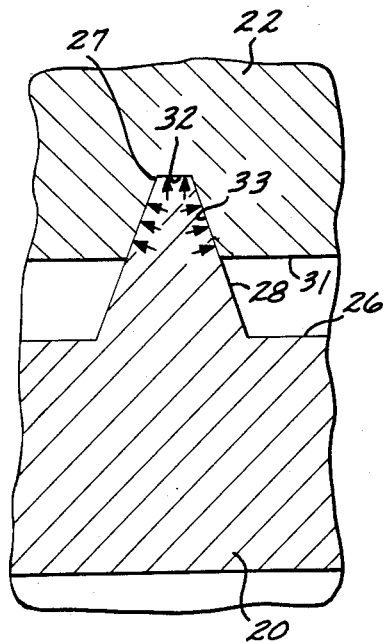
FIG. 7 is a cross-sectional, fragmentary view taken along line 7—7 of FIG. 6.
Figure 8:
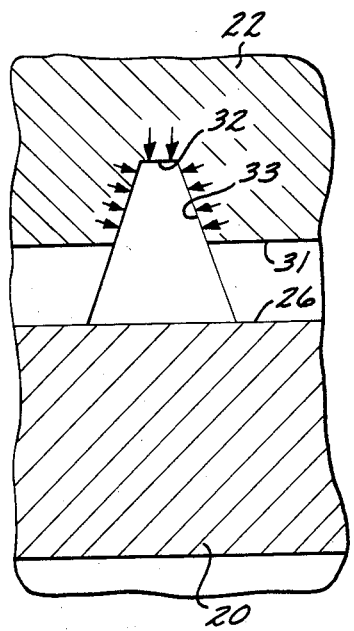
FIG. 8 is a cross-sectional view taken along line 8—8 of FIG. 6.
Figure 9:
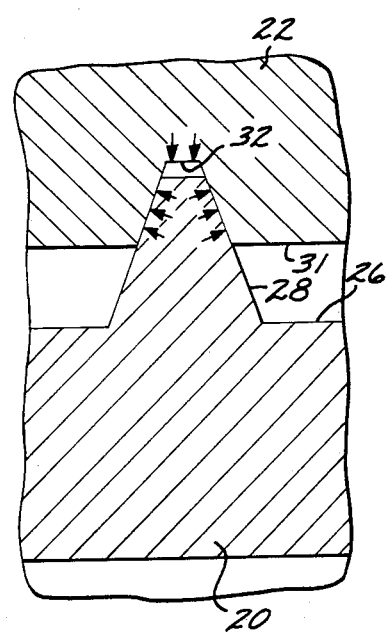
FIG. 9 is a cross-sectional view taken along line 9—9 of FIG. 6.

Although the invention has been described in detail with reference to the presently preferred embodiment, those of ordinary skill in the art will appreciate that various modifications can be made without departing from the invention. Accordingly, the invention is defined only by the following claims:

I claim:

1. A threaded element for forming a threaded profile in the wall of a bore formed in a material and for insertion into said bore so as to reinforce said bore, comprising:
   a cylindrical stem having an external thread, said stem having an unthreaded radius smaller than the unthreaded radius of said bore and a threaded radius greater than said unthreaded radius of said bore, said thread having a plurality of separate tapping lobes for cutting said threaded profile, each adjacent pair of said lobes having a recess defined between them, each of said tapping lobes being defined by
      two cutting arcs formed on opposite ends of each of said lobes, the apex of each of said cutting arcs defining the maximum thread radius of said threaded profile as measured from the center of said stem, each of said cutting arcs having a convex configuration relative to said center of said stem, and
      an escape-gap arc intermediate said two convex cutting arcs, said escape-gap arc having an escape radius, as measured from the center of said stem, smaller than said maximum thread radius and greater than the minimum thread radius of said threaded profile as measured from said center of said stem, said escape gap arc having a convex configuration relative to said center of said stem.

2. The threaded element of claim 1, wherein said lobes are equiangularly spaced.

3. The threaded element of claim 1, wherein said lobes are three in number.

4. The threaded element of claim 1, wherein a substantial increase in the encroachment area of said lobes is provided by each of said lobes having said escape-gap arc.

5. The threaded element of claim 4, wherein said substantial increase in said encroachment area of said lobes is substantially equal to 1.36 times said encroachment area of said lobes when each of said lobes does not have said escape-gap arc.

6. The threaded element of claim 1, wherein the difference between said escape radius and said unthreaded radius is greater than about 80% of the difference between said maximum threaded radius and said unthreaded radius.

7. A threaded element for forming a threaded profile in the wall of a bore formed in a material and for insertion into said bore so as to reinforce said bore, comprising:
   a cylindrical stem having an external thread, said stem having an unthreaded radius smaller than the unthreaded radius of said bore and a threaded radius greater than said unthreaded radius of said bore, said thread being characterized by a plurality of separate tapping lobes which cut said threaded profile and which define a recess defining a minimum thread radius of said threaded profile as measured from the center of said stem located between each adjacent pair of said lobes, each of said tapping lobes being defined by
      two convex cutting arcs formed on opposite ends of each of said lobes, the apex of each of said cutting arcs defining the maximum threaded radius of said threaded profile as measured from the center of said stem,
      a convex escape-gap arc intermediate said two convex cutting arcs, said escape-gap arc having an escape radius, as measured from the center of said stem, smaller than said maximum thread radius and greater than said minimum thread radius, and
      wherein the difference between said escape radius and said unthreaded radius is greater than about 80% of the difference between said maximum thread radius and said unthreaded radius.

8. The threaded element of claim 7, wherein said lobes are equiangularly spaced.

9. The threaded element of claim 7, wherein said lobes are three in number.

10. The threaded element of claim 7, wherein a substantial increase in the encroachment area of said lobes is provided by each of said lobes having said escape-gap arc.

11. The threaded element of claim 10, wherein said substantial increase in said encroachment area of said lobes is substantially equal to 1.36 times said encroachment area of said lobes when each of said lobes does not have said escape-gap arc.

* * * * *